Jan. 13, 1970  G. KLEE  3,489,064
FLUID OPERATED CONTROL METHODS AND APPARATUS
Filed Sept. 5, 1967  8 Sheets-Sheet 1

Inventor
Gerhard Klee
By
Watson Cole Grindle + Watson
Attys.

Jan. 13, 1970 G. KLEE 3,489,064
FLUID OPERATED CONTROL METHODS AND APPARATUS
Filed Sept. 5, 1967 8 Sheets-Sheet 2
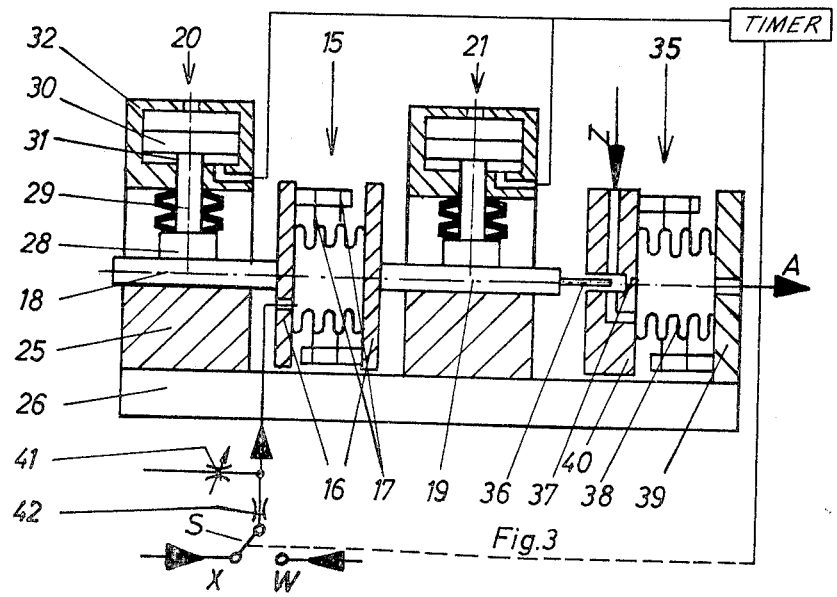
Fig. 3
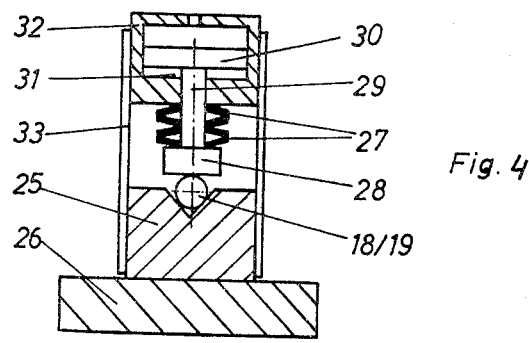
Fig. 4
| | 20 | 21 | ⇔ | ⋘ |
|---|---|---|---|---|
| I | − | + | W | X |
| II | + | + | W | X |
| III | + | + | X | W |
| IV | + | − | X | W |
| V | + | + | X | W |
| VI | + | + | W | X |
Fig. 5
Inventor
Gerhard Klee
By
Watson, Cole, Grindle & Watson
Attys.

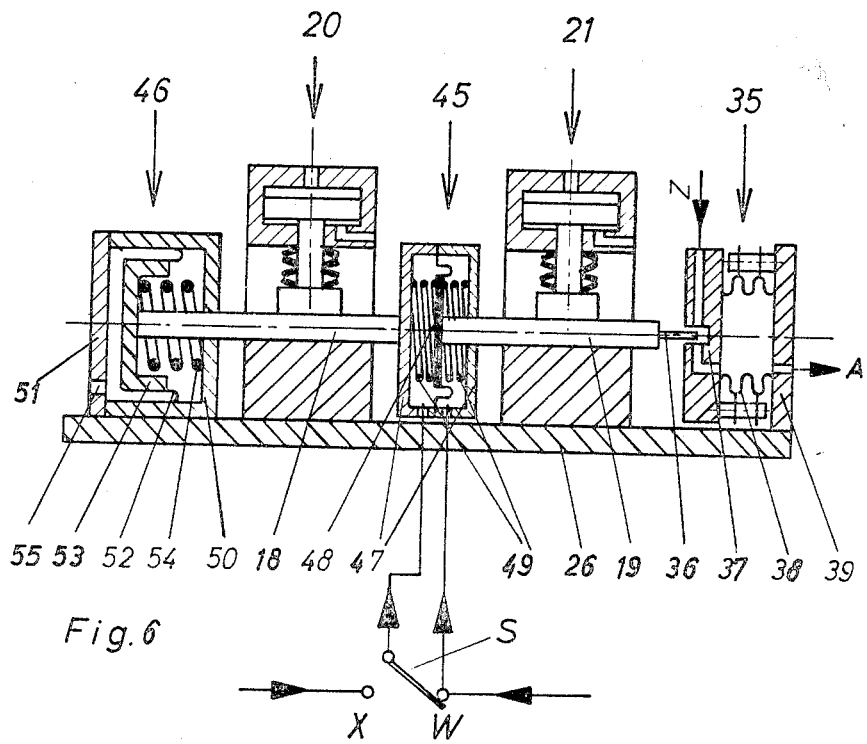

Jan. 13, 1970  G. KLEE  3,489,064
FLUID OPERATED CONTROL METHODS AND APPARATUS
Filed Sept. 5, 1967  8 Sheets-Sheet 4

Inventor
Gerhard Klee
By
Watson, Cole, Grindle & Watson
Attys.

| | 120 | 121 | S |
|---|---|---|---|
| 1 | − | + | W |
| 2 | + | + | W |
| 3 | + | + | X |
| 4 | + | − | X |
| 5 | + | + | X |
| 6 | + | + | W |

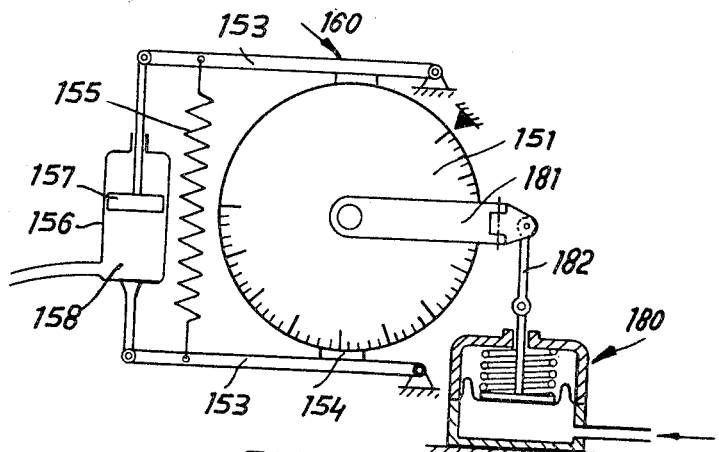
FIG. 13
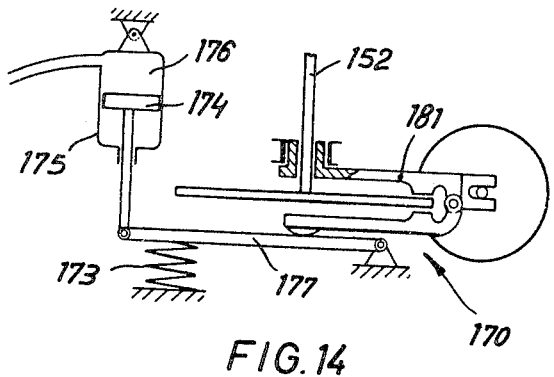
FIG. 14
|   | 160 | 170 | 180 |
|---|-----|-----|-----|
| 1 | +   | +   | W   |
| 2 | +   | +   | X   |
| 3 | −   | +   | X   |
| 4 | +   | +   | X   |
| 5 | +   | +   | W   |
| 6 | +   | −   | W   |
FIG. 15
Inventor
Gerhard Klee

|    | 160 | 170 | 180 |
|----|-----|-----|-----|
| 1  | +   | −   | 0   |
| 2  | +   | +   | 0   |
| 3  | +   | +   | 1   |
| 4  | −   | +   | 1   |
| 5  | +   | +   | 1   |
| 6  | +   | +   | 0   |
| 7  | +   | −   | 0   |
| 8  | +   | +   | 0   |
| 9  | +   | +   | 2   |
| 10 | −   | +   | 2   |
| 11 | +   | +   | 2   |
| 12 | +   | +   | 0   |
| 13 | +   | −   | 0   |
| 14 | +   | +   | 0   |
| 15 | +   | +   | 3   |
| 16 | −   | +   | 3   |
| 17 | +   | +   | 3   |
| 18 | +   | +   | 0   |

FIG.16

United States Patent Office 3,489,064
Patented Jan. 13, 1970

3,489,064
FLUID OPERATED CONTROL METHODS
AND APPARATUS
Gerhard Klee, Frankfurt am Main-Ginnheim, Germany, assignor to Samson Apparatebau A.G., Frankfurt am Main, Germany
Filed Sept. 5, 1967, Ser. No. 665,612
Claims priority, application Germany Sept. 5, 1966, S 105,696
Int. Cl. F15b 13/16; F16j 3/00
U.S. Cl. 91—388
13 Claims

ABSTRACT OF THE DISCLOSURE

The specification describes a pneumatic device comprising a comparison element arranged to be acted upon alternately by pressures corresponding to an input quantity and an output quantity. The comparison element is arranged to vary the relative position of two parts which can be clamped. During application of the input and output quantity pressures respectively first one and then the other part is clamped in accordance with the pressure applied. The position of one part therefore represents a function of the input and output quantities.

---

The invention more particularly relates to apparatus for regulating, controlling or setting fluid operated (preferably pneumatically operated) regulators and servo-motors or the like, in which the input and output quantities in a system are compared with each other to find the deviation or error between the two quantities.

In conventional regulating equipment exhibiting proportional integral behaviour comparison between the input and output quantities is generally not carried out sequentially but simultaneously and in many cases this leads to complexity in the construction of the regulating equipment. If for example the output quantity is discontinuously measured, as frequently occurs in manufacturing and process technology, known regulators of the type adapted to effect sequential, that is to say non-simultaneous, comparison of the input and output quantities must be connected with additional devices or equipment, for example for storing the output quantity. A principal object of the invention is to carry out these or similar regulating operations in a particularly simple and convenient manner with equipment of low cost.

In accordance with these and other objects the present invention consists in a control system comprising means for acting on a controlled member, means for sensing an output quantity of the controlled member and providing a corresponding output quantity signal, and a comparison element arranged to move in response both to the output quantity signal and an input quantity signal to provide a signal for controlling action on the controlled member, characterised in that the system further comprises means for repeatedly locking such movement of the comparison element and means for connecting the comparison element alternately with the input and the output signals respectively during periods when the comparison element is free to move, the comparison element being arranged to move in accordance with a difference in magnitude of the input and output quantity signals and to remain locked after so moving.

As a modification of the apparatus the deviation between the input and output quantities of the control system can be determined firstly by a special operational step, for example by means of a calculating means with its output connected with the regulator, and then fed as such into the comparison element or measuring means.

Preferably the input and/or output quantities or the corresponding control deviation can be fed to the comparison element or measuring means in the form of pneumatic pressure values and be converted into corresponding steps of the latter. There remains however the possibility of pre-indicating at least one of the values, for example the input quantity by means of an adjustable spring or the like and comparing it with the other value.

A device which has been found particularly suitable for carrying out the method in accordance with the invention uses as the measuring means a step-type or incremental regulator whose relatively movable terminal part can be set in accordance with the desired movement steps of the regulator in two clamping means which can be operated one after the other or simultaneously. In the case of pneumatic indications of the input and output quantities the sequential comparison of these two values can be carried out in a particularly simple and advantageous manner with the use of a pressure-displacement transducer, for example in the form of a spring-held bellows or membrane type measuring means, the transducer being arranged between two mechanically operated clamping positions and being arranged to be connected in accordance with a certain sequence with the input and output quantities of the control system, the two clamping positions being tightened or released in a corresponding sequence.

Such an incremental regulator or pressure displacement transducer can be moved incrementally in a positive or negative direction, that is to say forwards or backwards, in accordance with each control deviation between the input and output quantities sensed, the direction of the displacement depending upon the prefix sign of the control deviation while the size of the displacement depends upon the amount of the control deviation taking into account the P-range of operation of the regulator.

A device in accordance with the invention can be not only used for carrying out control operations with discontinuously measured control quantities, but also for control operations in the case of continuously measured control quantities, such as temperature or pressure values, measuring means in the latter case being fed with the aid of any suitable control means alternately with the input and output quantities present at the input or inlet of the regulator. In both cases the invention enables an additional regulator to be dispensed with.

The output quantities of the measuring means or incremental regulator can directly control a control or servo part or the like via the relevant terminal or output part, that is to say it can alter the setting of a control valve or throttling valve or alternatively, move the tool carrier of a machine tool. This enables a separate servo-motor for this purpose to be dispensed with it. The measuring means or incremental regulator can however also be connected with a subsequent unit which converts the output of the regulator into a corresponding output signal, preferably a pneumatic pressure operated servo-motor.

Various embodiments of the invention are now described with reference to the attached drawing.

FIGS. 1 and 2 diagrammatically show a regulating circuit used in accordance with the invention showing application to a machine tool.

FIGS. 3, 4 and 5 are diagrammatic longitudinal sections through a regulating device and a part of it in accordance with a first specific embodiment of the invention, together with a table showing the regulating functions or steps.

FIGS. 6 and 7 show a diagrammatic longitudinal section through a regulating device in accordance with a second embodiment of the invention together with a table showing the corresponding regulating functions.

Figure 8:
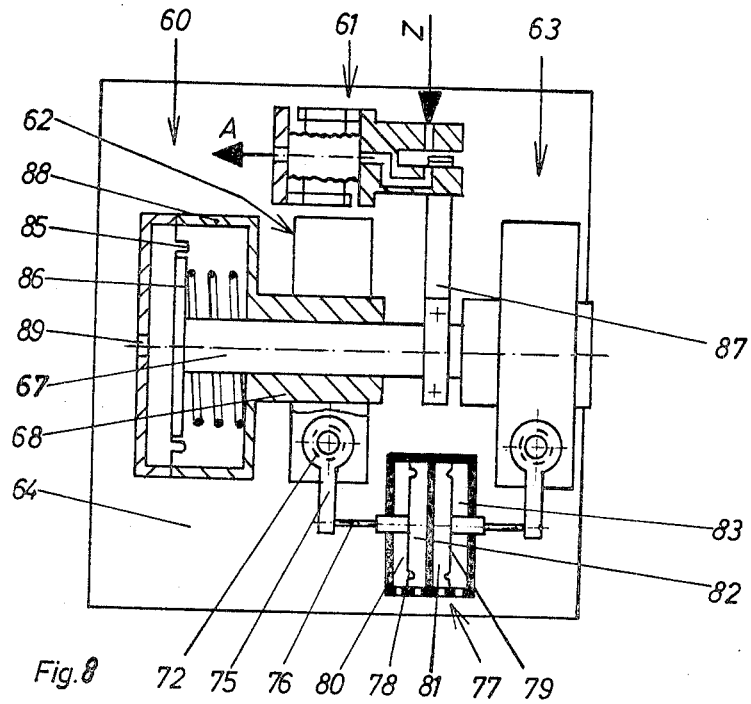
Figure 9:
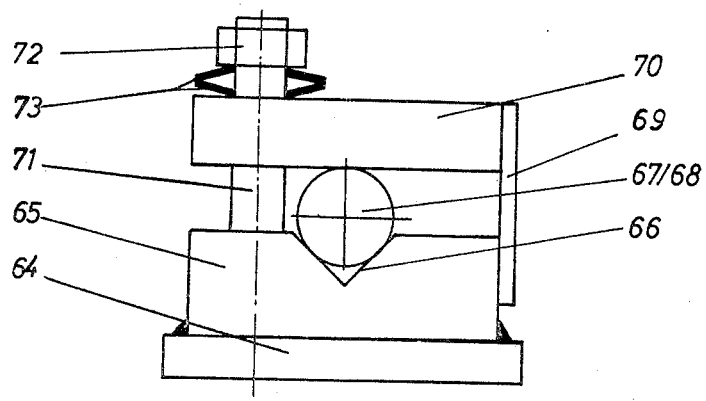

FIGS. 8 and 9 schematically show, partially in a longitudinal section, partially in plane, and partially in a somewhat enlarged diagrammatic cross section a regulating device in accordance with a third embodiment of the invention.

Figure 10:
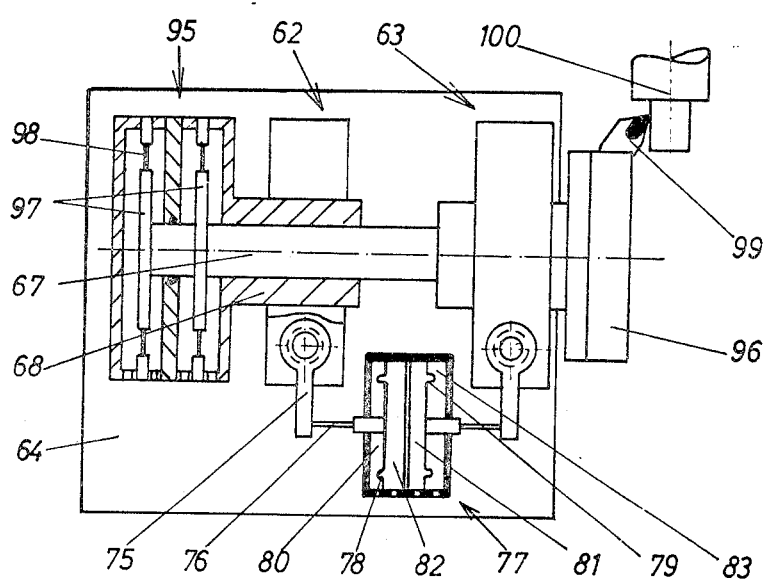

FIG. 10 shows partially in longitudinal section and partially in plane a regulating device for a lathe or similar machine tool in accordance with a fourth embodiment of the invention.

Figures 11, 12:
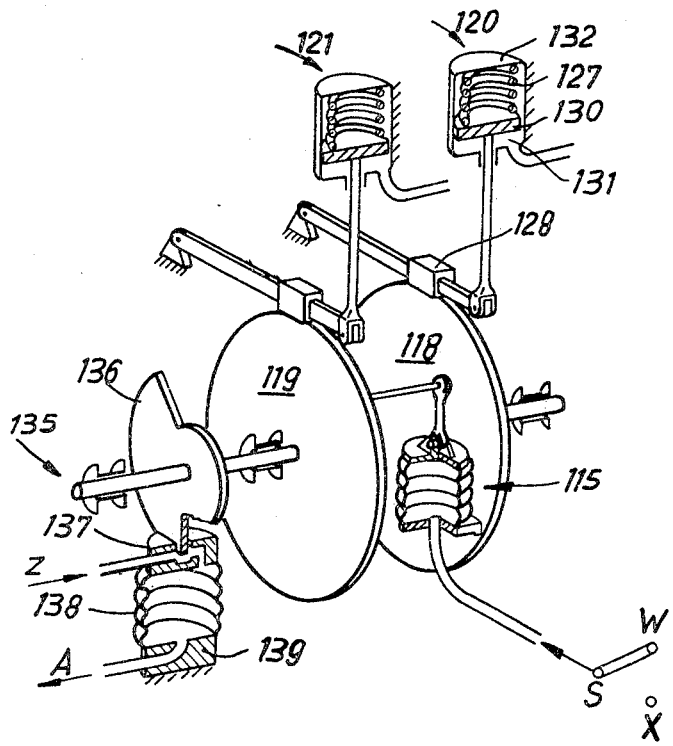

FIG. 11 shows in perspective and partially in section a regulating device in accordance with the invention in which the measuring means moves angularly.

FIG. 12 is a table of the steps formed in accordance with the equipment of FIG. 11.

FIGS. 13 and 14 show a further embodiment of a device in accordance with the invention with a rotary servo-motor.

FIGS. 15 and 16 represent corresponding tables of operational steps.

Figure 1:
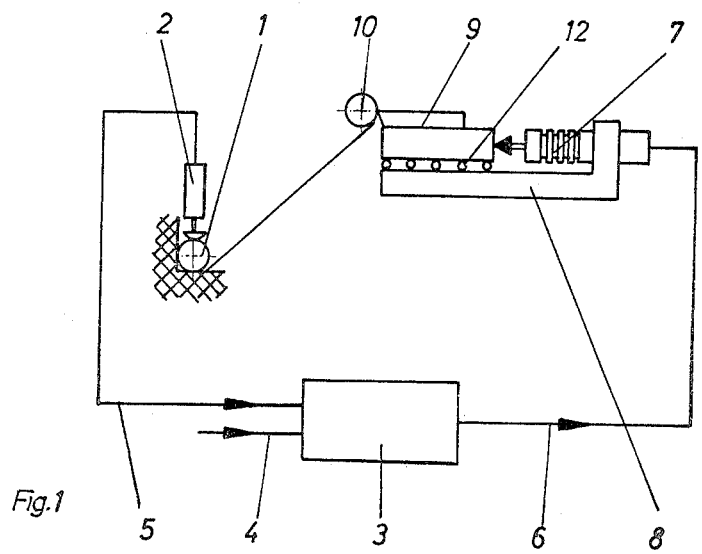
Figure 2:
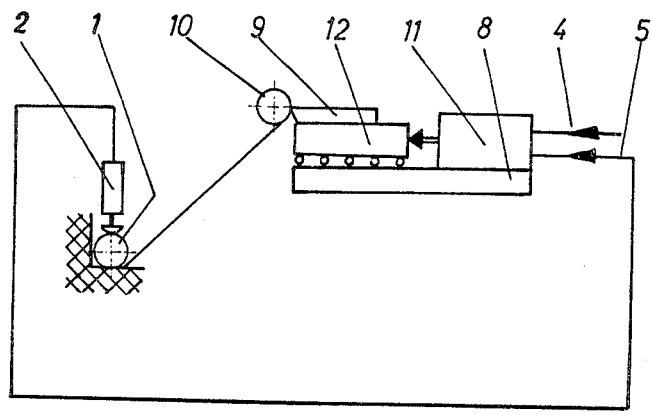

The regulating circuits schematically shown in FIGS. 1 and 2 represent two basic circuits of the invention with discontinuous measurement of the control quantities with reference to a control process in which the diameter of workpieces being turned on a lathe is to be regulated. In this arrangement the output quantity of a finished workpiece 1 is determined by a pneumatic measuring head 2 and fed to an incremental regulator 3 via a duct 5. This incremental regulator compares the instantaneous output quantity with the input quantity which is indicated either pneumatically via a duct 4 or mechanically by means of an adjustable spring or the like. Within the incremental regulator 3 the control deviation determined is converted by means of an output transducer into a pneumatic output quantity signal which is fed via a duct 6 to a servo-motor 7 as a servo control signal. The pneumatically operated servo-motor 7 which can be constructed in any suitable manner, for instance in a known manner, is arranged on the slide 8 of an automatic lathe not shown in detail in the drawing, and acts on the tool carrier 12 whose tool 9 is machining the workpiece 10. When the servo operating signal or quantity changes owing to a control deviation, the stroke of the servo-motor 7 is altered and with it the setting of the turning tool 9. Consequently the workpiece 10 held in the lathe is turned so as to have accordingly greater or smaller diameter, the control or regulating cycle being repeated if required until the workpiece corresponds with the input quantity.

The regulating device shown in FIG. 2 differs from that of FIG. 1 substantially in that the incremental regulator 11 also serves as a servo-motor. The output signal of the regulator 11 acts directly, that is to say without a pneumatic output device, mechanically on the tool holder 12 and thus on the turning tool 9. In other respects the manner of operating of this regulating circuit corresponds with that of the regulating circuit according to FIG. 1.

In the case of the regulator shown in FIGS. 3 and 4 a measuring means or comparison element 15 with a metal bellows is used whose parts 16 are held together by means of strip springs 17 and whose end walls are connected with rod like terminal parts 18 and 19. These rods or parts 18 and 19 can be held in clamps 20 and 21. Each clamp consists of a block 25 fixed on the base plate 26 of the regulator and having a groove in which the rods 18 and 19 are held. The rod can be clamped by means of a spring 27 between a jaw 28 groove of the block 25. The jaw 28 is connected by means of a piston rod 29 with a piston 30 sliding in a cylinder 32. When the cylinder space 31 below the piston 30 is put under pressure, the clamp is released and the rod 18 and 19 can be moved axially. The cylinder is connected firmly with the block 25 by means of massive straps. At the free end of the rod 19 for the output signal of the measuring means 15 a vane 36 is attached sliding between the blowing and receiving nozzle 37 of an output device 35. The blowing and receiving nozzle fed by the supply duct Z are arranged in the cover 40 of a spring mounted metal bellows 38 whose end 39 is mounted on the base plate 26 of the regulator. The output pressure is supplied from the metal bellows 38 in direction of the arrow A for example through the pulse duct 6 of the control circuit shown in FIG. 1 to the servo-motor 7. The pressure measuring means 15 is supplied with the input quantity W and the output quantity X sequentially, that is to say one after the other, by means of a switch S. The switch S and clamps 20 and 21 are operated by means of a conventional timer providing fluid control pulses. Since such timers are readily available from firms specializing in, for instance, automation, the details of the timer are not given. In the input part of the pressure measuring means 15 there is also a pressure distributing circuit which consists of a constant value choke 42 and an adjustable chock 41 and serves for setting the proportional range of the controller. Instead of this the proportional range of the output part 35 can be made adjustable. The cycle for comparing the input and output quantities with this device is carried out in a number of sequential steps shown in the table of FIG. 5.

During the step I the clamp 20 is released, that is to say the rod 18 of the measuring means or comparison element 15 can slide freely, and the clamp 21 is tightened so that the rod 19 of the measuring means 15 is held firmly. In the table of steps — is used to indicate released and + to indicate tightened. If it is supposed that the switch S is in the position W, so that the measuring means 15 receives the input quantity, the measuring means consequently makes a movement on the left corresponding to the input quantity. During the two following steps II and III both clamps 20 and 21 are tightened so that the measuring means 15 cannot move. However on passing from step II to step III the switch S is switched over from the position W into the position X. In this position shown in FIG. 3 the measuring means 15 receives the output quantity X. In step IV the clamp 21 is released, that is to say the rod 19 is freed. If the input and output quantities are now equal, the measuring device is not moved and the position of the rod 19 is also not changed. If however the output quantity is greater than the input quantity, corresponding to a positive control deviation, the measuring means 15 moves the rod 19 to the right. If on the other hand the output quantity is smaller than the input quantity, corresponding to a negative control deviation, the measuring means 15 draws the rod 19 back towards the left. The position reached by the rod 19 must now be fixed. For this purpose in step V both clamps 20 and 21 are tightened. The switch S, which in step V is at first connected with the output quantity X, is now switched over in step VI to be connected with the input quantity W. With this the comparison cycle is completed. The terminal position of the measuring means, the position of the rod 19, remains fixed without alteration until the next comparison between the input output quantities begins again in step I. During the change in position of the rod 19 the position of the vane 36 in the nozzle system 37 of the output unit 35 so that as a result the displacement is transformed into a change in pressure proportional to the movement of the rod 19. In this manner a corresponding pneumatic output signal of the regulator is obtained. The control vane 36 is arranged in relation to the output unit 35 in the input-output quantity comparison cycle in such a manner that a positive control deviation corresponds with a reduction in the output pressure at A, that is to say the direction of operation of the regulator in this case is "rising/falling."

A reversal in the direction of operation so as to be "rising/rising," in which a positive control deviation corresponds with an increase in the output pressure, and is brought about in a simple manner by changing the association between the actuation of the clamps 20 and 21 and the position of the switch S. In the two last vertical columns of the table of FIG. 5 the switch positions for these two directions of operation are indicated. The control of the regulator shown in FIGS. 3 and 3a in accordance with this table can be brought about with a known following control which is not shown in the drawing.

The embodiment of the regulating device of FIGURES 6 and 7, instead of the pressure measuring means 15 of FIG. 3, is provided with a differential pressure measuring means 45 in which the control deviations are arrived at. A membrane 48 is mounted in a control means housing 47 between the springs 49. As was the case with the device of FIG. 3, a rod 18 is connected with the housing 47 and is mounted in a clamp 20 while the rod 19 passing through the housing 47 and connected with the membrane 48 is mounted in the clamp 21. At the free ends of the rod 19 the control vane 36 of an output unit 35 is mounted as is shown in FIG. 3. The rod 18 is extended to the left beyond the clamp 20 and connected with an additional driving system 46 which enables a rapid movement of the measuring means as far as the terminal position, or a similar coarse adjustment of the setting measuring means to be carried out. This drive system consists of a rolling membrane or cuff 52 in circuit between a housing 50 and a housing cover 51, a membrane carrier 53, and a spring 54. The housing 50 is connected with the base plate 26 of the regulator. The free end of the rod 18 inserted into the housing 50 is connected with the membrane carrier 53. When the membrane or cuff 52 is acted upon by pressure entering through inlet 55 after both the clamps 20 and 21 have been released, the rod 18 serves to displace the measuring means 15 and thus also rod 19. For example the drive system 46 can be so constructed that the measuring means can be displaced with a variation in pressure of 0.2–1.0 atmosphere gauge from one end or terminal position into the other terminal position. The manner of operation of this regulating device can readily be understood on reference to the table of steps and switching operations given in FIG. 7 and the explanation given in connection with the embodiment in FIG. 3. The positions of the switch S which in one position transmits the input quantity W to both chambers or spaces, and under the other position transmits the output quantity X into the one measuring means chamber, while the other measuring means chamber remains connected with the input quantity, are given in the table again for both directions operation of the regulator.

The embodiment of the invention shown in FIGS. 8 and 9 is in the form of a regulating device in which a control departure formed in a measuring means or comparison element 60 and converted into a displacement is transformed by means of an output unit 61 into a pressure proportional to the control deviation. The two clamps 62 and 63 mounted on the regulator base plate 64 can be constructed as was the case with the previous embodiments of the invention or in accordance with FIG. 9. A receiving body 65, welded on the base plate 64 has a receiving groove 66 for the rod 67 or 68 to be clamped. On the receiving body 65 a holding arm 70 is held by means of a spring band 69. Through a hole in this holding arm 70 there extends the upper end of a fixed bolt which is fixed in the receiving body 65 and has on its thread a nut which can be screwed to act upon Belleville washers 73. The nut 72 can be used to tighten the rod 67 or 68. This can be carried out pneumatically as shown in FIG. 8. The tightening nuts 72 of the two clamps 62 and 63 are for this purpose connected by levers 75 and coupling rods 76 with a double membrane system 77. When the membranes 78 and 79 are acted upon by the pressure introduced into the chambers 80 and 81, the nuts 72 are pulled tight and the clamps 62 and 63 tightened. Conversely, the clamps are released if the membranes are acted upon by pressure introduced into the chambers 82 and 83. Since all chambers can also be fed with pressure independently of one another, it is also possible to tighten or release only one of the clamps 62 and 63. The rod 67 is connected with the membrane plate 86 of the measuring means 60 and is mounted in the clamp 63 so as to be able to move. It also carries a control vane 87 for the output unit 61. The rod 68 has a hole in the longitudinal direction and is firmly connected with the membrane housing 88. The rod is mounted in the clamp 62, the rod 67 passing through the hole in the rod 68. The method of operation of this control device basically corresponds with that of the regulator in accordance with FIG. 3 with the only difference that instead of the metal bellows type measuring means 15 use is made of a measuring means 60 with a spring loaded membrane 85 acted upon by the pressure coming through the inlet 89 in correspondence with the input or output quantity.

In the construction in accordance with FIG. 10 the regulator also forms the servo-motor. The membrane system 95 in this case preferably includes steel membranes 97 which owing to machined away parts in the zone 98 are preferably so dimensioned that they simultaneously form end membranes. These membranes are very stiff so as to ensure that the counter forces due to the working tool 99 on the tool carrier 96 can only affect the measuring means 95 to a slight degree at the most. The membranes 97 therefore only move through small distances. Preferably several such membranes 97 are arranged one behind the other in order to increase the thrust produced. The output signal from the measuring means 95 in this case determines mechanically in a direct manner the setting of the carrier 96 attached to the rod 67 and thus the position of the working tool 99 in relation to the workpiece 100.

Embodiments of the invention in which the measuring means performs rotational or angular movements instead of translatory ones offer the advantage that the moving parts of the device can be balanced as to weight and can be directly supported so that bearing errors and deviations, for example due to vibrations, can be avoided. A further advantage of the use of a system with angular movements is that the movement of the servo-motor is not limited. One can thus arrange the system so that the angular movement is greater than 360°. The translatory movement can thus be converted into a rotary movement.

A device with rotary or angular movement of the measuring means can for example be constructed in accordance with the invention in such a manner that the measuring means connects two rotary terminal parts, such as discs or similar bodies, in such a manner that variations in pressure in the measuring means bring about alterations in the angle of one end part in relation to the other. The corresponding rotary end parts, such as discs or the like are held by clamps or the like or released by them, in accordance with a further important feature of the invention. The angular movement of one rotary end part, for example one of the discs, is converted by means of an output unit into a proportional pressure in a manner similar to a device working with translatory movement.

In accordance with a further advantageous embodiment of the invention with rotary or angular movements, the device is provided with a rotary terminal part, for example a disc-shaped or similar body, which can be held or released by a clamp, the pressure measuring means being capable of being connected by means of a clamp with the end or terminal part, for example the disc, while the clamp is capable of being released by means of a pressure responsive part.

With a device in accordance with the invention it is possible to carry out summating operations of all types or determine averages. This means that the device can for instance be applied to the measurement of quantities of liquids in a number of containers by adding the levels. A particularly advantageous field of application for the invention is the counting or measurement of quantities of flowing media. In a construction designed for this purpose in accordance with the invention the operational steps must be precisely timed and the input pressure must be proportional to the indication of a flow meter or the like. For this application a device whose measuring means forms rotary movements is particularly advantageous because a counter can be driven directly. Also the total counting of a number of flow stations can be carried out comparatively simply in accordance with the invention. In this case the step cycles of the individual flow meters, whose values are to be compiled, are conveniently arranged so as to occur in sequence and for determining the numerical value the total time of all individual cycles is used.

Some examples of devices in accordance to the invention in which the measuring means forms angular or rotary displacements and the displacement steps are angular rotations instead of translatory movements, are shown in FIGS. 11, 12, 13, 14, 15 and 16 with the associated table of steps.

FIG. 11 shows a device corresponding in principle with the device according to FIG. 3 but arranged to perform angular movements instead of translatory ones. The rotary discs or wheels 118 and 119 are connected together by the pressure measuring means 115 in such a manner that a change in pressure into the measuring means 115 causes a change of the angle of the disc or wheel 119 in relation to the disc 118. The latter disc can be held by a clamp 120 while the disc 119 can be held by a clamp 121 when a pressure obtains in the corresponding cylinder chamber 131, 132 on piston 130 because in this case a spring 127 presses the brake shoe 128 against the periphery of the corresponding wheel or disc. However if the pressure is transmitted to the cylinder chamber 131, the spring 127 is compressed so that the brake shoe 128 is raised and the corresponding disc is released for angular movement. The angular movements of the disc 119 are converted by means of an output unit 135 into a proportional pressure at A. For this purpose, for example, a spiral-shaped disc 136, which is connected so as to rotate with the disc 119, is arranged in the slot of a blowing and receiving nozzle system 137 arranged on the head of a resilient bellows 138. The bottom 139 of the resilient bellows is arranged so as to remain stationary.

The manner of operation of this device can easily be understood from the table of FIG. 12 and the description in relation to FIG. 3. FIGS. 11 and 12 show the arrangement for an increasing pressure at A when the pressure of the output quantity is greater than the input quantity. A reversal can be achieved either by reversing the switch positions W and X of the switch S (input and output quantities) or by reversing the spiral disc 136.

A further device with a rotating terminal servo part is diagrammatically shown in FIGS. 13 and 14. FIG. 13 shows the device from the side, the drive of the clamps 170 being omitted for the sake of clarity.

FIG. 14 shows a plane of view in which the clamps 160 are omitted for the same reason. FIG. 15 shows the corresponding table of steps.

A disc or wheel 151 is connected with a shaft 152 and the two can rotate when they are released by the clamp 160. The clamp consists of two levers 153 each with a brake shoe 154 pressed by a spring 155 against the periphery of the disc 151, so as to hold the disc against rotation. The levers 153 are also connected by a cylinder 156 with pistons 157. If pressure is communicated to the cylinder space or chamber 158, the braking levers 153 are pushed away from each other against the force of the spring 155 and the disc or wheel 151 is released. The pressure measuring means 180, which consists of a spring loaded membrane, is connected with a lever 181, pivoting on a shaft, by means of a link 182. The lever 181 carries a clamp 170 by means of which it can be clamped by the action of a spring 173 on the disc 151. The clamp 170 is however also connected with a piston 174 and a cylinder 175. When the cylinder space 176 is put under pressure, the lever 177 is raised against the action of the spring 173 away from the clamp and the disc 151 is released from its connection with the lever 181. The step table FIG. 15 explains the manner of operation of this device when the latter is used as a regulator.

The device can however also be used for other purposes such as calculating, for instance addition and subtraction. In this case the measuring means 180 is then fed with a pressure corresponding to the zero value instead of the input quantity and, instead of the output quantity, a pressure corresponding to the value to be measured. The pressures which are greater than the pressure corresponding to the zero value are then added and those which are smaller are subtracted. The setting of the disc or wheel 151 gives the result. The disc can be provided with a scale or can drive a counting device directly. Instead of the pressure measuring means 180 it is also possible to use a differential pressure measuring means. On one side of the differential pressure measuring means those pressures are fed in which are to be added while on the other side pressures are fed in which are to be substracted.

A further practical field of application of the invention is for example the counting of quantities on the basis of flow measurements. The flow is measured for example in kg. per minute. If the flow is measured for each minute and the values are added together the quantity in kilograms flowing through the measuring device is obtained. The device shown in FIGS. 13 and 14 is suitable for determining quantities if the stepping cycle is precisely timed. The input quantity is then zero pressure and the output quantity is the pressure which corresponds to the instantaneous flow value, both these pressure values being fed to the pressure measuring means. Preferably a counting device is provided driven by the shaft 152.

Counting of quantities as a whole for several partial flows which are measured by several flow meters, can be carried out in accordance with a further embodiment of the invention. The table of operational steps of FIG. 16 shows the manner of operation. In the table 0 denotes zero pressure while the numbers indicate the flow measured at the various measuring positions. The duration of the whole cycle (18 steps) is used as a basis for determining the quantities counted. If the device is used for determining an average or means or for the determination of the contents of several containers by determining the differences in height the device must be set at zero after each cycle, this being simple to carry out with known means.

I claim:
1. In a control system comprising means for acting on a controlled member, means for sensing an output quantity of the controlled member and providing a corresponding output quantity signal, and a comparison element arranged to move in response both to the output quantity signal and an input quantity signal to provide a signal for controlling action on the controlled member, the improvement that the system further comprises means for repeatedly locking such movement of the comparison element and means for connecting the comparison element alternately with the input and the output signals respectively during periods when the comparison element is free to move, the comparison element being arranged to move in accordance with a difference in magnitude of the input and output quantity signals and to remain locked after so moving.

2. A system in accordance with claim 1 further comprising
 (a) as the comparison element, two movable parts, a fluid pressure-mechanical transducer connecting the two parts together and arranged to produce relative movement between them,
 (b) two independently operating clamping means for holding the movable parts against movement,
 (c) means for operating the clamping means alternately with intervals between clamped periods in which one clamp and then the other is free, and
 (d) means for connecting the transducer with the input quantity signal when one clamping means is free and for connecting with the output quantity signal when the other clamping means is free.

3. A system in accordance with claim 2 further comprising a mechanical-fluid pressure transducer arranged to be operated by one of the two movable parts.

4. A system in accordance with claim 3 in which the mechanical-fluid pressure transducer comprises a vane arranged to act upon a jet of fluid.

5. A system in accordance with claim 2 in which the fluid pressure-mechanical transducer connected with the two movable parts is in the form of a bellows element.

6. A system in accordance with claim 5 in which the two movable parts are arranged for translatory movement.

7. A system in accordance with claim 6 in which the two movable parts are in the form of aligned rods extending in opposite directions from the fluid pressure-mechanical transducer and the clamping means are arranged to bring pressure to bear on the rods in a direction susbtantially towards the axes of the rods, the clamping means being fluid pressure operated.

8. A system in accordance with claim 7 in which one rod is arranged to operate in mechanical-fluid pressure transducer, and the system further comprises fluid pressure operated coarse setting means arranged for moving the other rod.

9. A system in accordance with claim 8 in which the bellows is arranged to be acted firstly on both sides by one of the quantity signals and then by two quantity signals on both of its sides simultaneously.

10. A system in accordance with claim 7 in which the two movable parts are in the form of a hollow rod and a rod fitting inside it, the two rods extending in the same direction from the fluid pressure-mechanical transducer, the system further comprising two sets of clamping jaws arranged to engage the two rods respectively, screw threaded means for fixing the jaws in the sets of jaws, and pressure operated means for operating the screw threaded means.

11. A system in accordance with claim 10 further comprising a cutting tool connected with one of the rods.

12. A system in accordance with claim 2 in which the movable parts are arranged to rotate and the fluid pressure-mechanical transducer is arranged to produce relative rotational movement between them.

13. A system in accordance with claim 12 in which the movable parts are in the form of circular discs and the system further comprises radially acting pressure operated brake means for engaging the peripheries of the discs, and a vane arranged to be rotated by one of the discs for controlling a nozzle.

References Cited

UNITED STATES PATENTS

| | | | |
|---|---|---|---|
| 1,085,964 | 2/1914 | Briggs | 91—44 |
| 3,283,669 | 11/1966 | Lissou | 91—388 |
| 3,390,699 | 7/1968 | Fedoseev et al. | 137—85 |
| 3,384,116 | 5/1968 | Fedoseev et al. | 137—85 |
| 2,969,773 | 1/1961 | Henry | 91—363 |

FOREIGN PATENTS 551,170  2/1943  Great Britain.

PAUL E. MASLOUSKY, Primary Examiner

U.S. Cl. X.R.

73—194; 82—46; 92—28, 34; 235—200